United States Patent [19]

Griffin et al.

[11] Patent Number: 4,815,129

[45] Date of Patent: Mar. 21, 1989

[54] VIDEO ENCRYPTION SYSTEM

[75] Inventors: John Griffin, Doylestown; David Grubb, Huntingdon Valley; Joseph Glaab, New Hope, all of Pa.

[73] Assignee: General Instrument Corp., New York, N.Y.

[21] Appl. No.: 688,503

[22] Filed: Jan. 2, 1985

[51] Int. Cl.[4] .............................................. H04N 7/167
[52] U.S. Cl. ........................................ 380/15; 380/17; 380/20
[58] Field of Search ............... 358/120, 122, 123, 124, 358/114; 350/10, 15, 17, 20

[56] References Cited

U.S. PATENT DOCUMENTS

| | | |
|---|---|---|
| 2,477,679 | 8/1949 | Young . |
| 2,619,530 | 11/1952 | Roschke . |
| 2,857,455 | 10/1958 | Joliffe . |
| 2,923,764 | 2/1960 | Druz . |
| 3,313,880 | 4/1967 | Bass . |
| 3,335,128 | 8/1967 | Johnson . |
| 3,485,941 | 12/1969 | Bass . |
| 3,529,081 | 9/1970 | Rider . |
| 3,723,637 | 3/1973 | Fujio et al. ............................. 358/12 |
| 4,222,068 | 9/1980 | Thompson ........................... 358/120 |
| 4,336,553 | 6/1982 | den Toonder ...................... 358/120 |
| 4,338,628 | 7/1982 | Payne et al. ......................... 358/120 |
| 4,396,947 | 8/1983 | Cheung ................................. 358/120 |
| 4,424,532 | 1/1984 | den Toonder et al. ............. 358/120 |
| 4,471,379 | 9/1984 | Stephens ............................. 358/120 |
| 4,523,228 | 6/1985 | Banker ................................... 380/15 |
| 4,598,318 | 7/1986 | Robbins ................................. 380/15 |
| 4,614,970 | 9/1986 | Clupper et al. ....................... 380/15 |

FOREIGN PATENT DOCUMENTS 2038137A 11/1979 United Kingdom .

Primary Examiner—Stephen C. Buczinski
Assistant Examiner—Linda J. Wallace
Attorney, Agent, or Firm—Hopgood, Calimafde, Kalil, Blaustein & Judlowe

[57] ABSTRACT

An encrypted video distribution system includes a signal originating station which distributes television signals in a format unrecoverable by a standard television receiver. In particular, the normally occurring vertical and horizontal synchronizing pulses are deleted and, optionally also, video information is selectively inverted about a voltage reference potential intermediate the black and white levels. To permit synchronization restoration, a keying pulse is transmitted once each video field, and a synchronizing digital code burst transmitted once each frame—all at a fixed, predetermined intra-frame timed relationship. At each authorized subscriber location, the keying pulse and digital code burst are employed to lock a receiver frame clock which derivatively gives rise to all requisite reception-permitting synchronizing pulses. The transmitted information also contains information sufficient to restore the inverted video program content.

30 Claims, 4 Drawing Sheets

FIG. 1  TRANSMITTER/SCRAMBLER

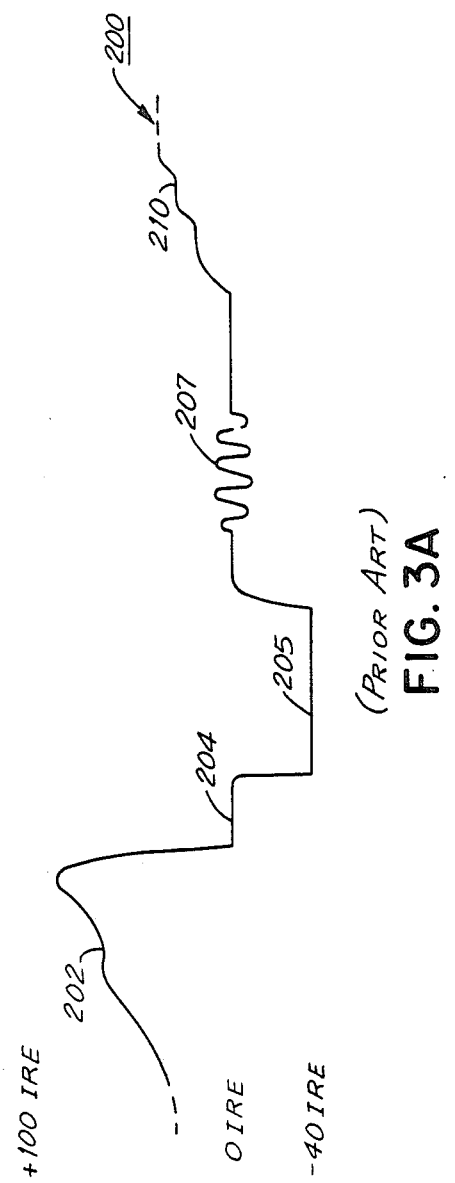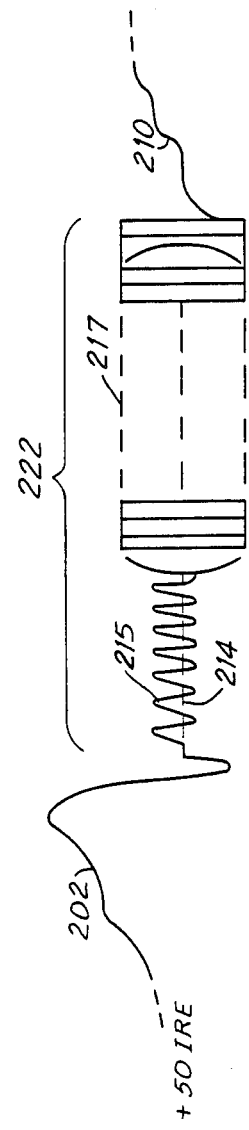

VIDEO ENCRYPTION SYSTEM

DISCLOSURE OF THE INVENTION

This invention relates to video signal distribution systems and, more specifically, to video signal transmission distribution systems characterized by signal security permitting reception of scrambled television programs only by authorized recipients.

It is an object of the present invention to provide improved encrypted television signal distribution apparatus.

More specifically, it is an object of the present invention to provide a secure signal distribution system for restricting reception of encrypted (scrambled) premium television programming—as to subscribers in a pay television environment.

It is a further object of the present invention to provide a video signal distribution system which disseminates signals unrecoverable by a conventional television receiver; where the transmitted signal does not contain horizontal or vertical synchronizing pulses; and where all signal content is contained within the normal frequency bounds of a television program.

Yet a further feature of the present invention is the provision of a scrambled television signal distribution system which disburses the radiated energy content to obviate interference with such services as terrestrial microwave.

The above and other objects of the present invention are realized in a specific, illustrative embodiment which includes a signal originating station distributing television signals in a format unrecoverable by a standard television receiver. In particular, the normally occurring vertical and horizonal synchronizing pulses are deleted and, optionally also, video information is selectively inverted about a voltage reference potential intermediate the black and white levels. To permit synchronization restoration, a keying pulse is transmitted once each video field, and a synchronizing digital code burst transmitted once each frame—all at a fixed predetermined intra-frame timed relationship.

At each authorized subscriber location, the keying pulse and digital code burst are employed to lock a receiver frame clock which derivatively gives rise to all requisite reception-permitting synchronizing pulses. The transmitted information also contains information sufficient to restore the inverted video content.

In accordance with one aspect of the present invention, the base band content of the composite video wave is varied about a means value to disburse the radiated frequency modulated signal energy, hence minimizing interference with broadcast services such as terrestrial microwave.

The above and other features and advantages of the present invention will become more clear from the following detailed description of a specific, illustrative embodiment thereof, presented hereinbelow in conjunction with the accompanying drawing, in which:

FIGS. 3A, 3B and 4 are waveforms characterizing operation of the instant invention.

Figure 1:
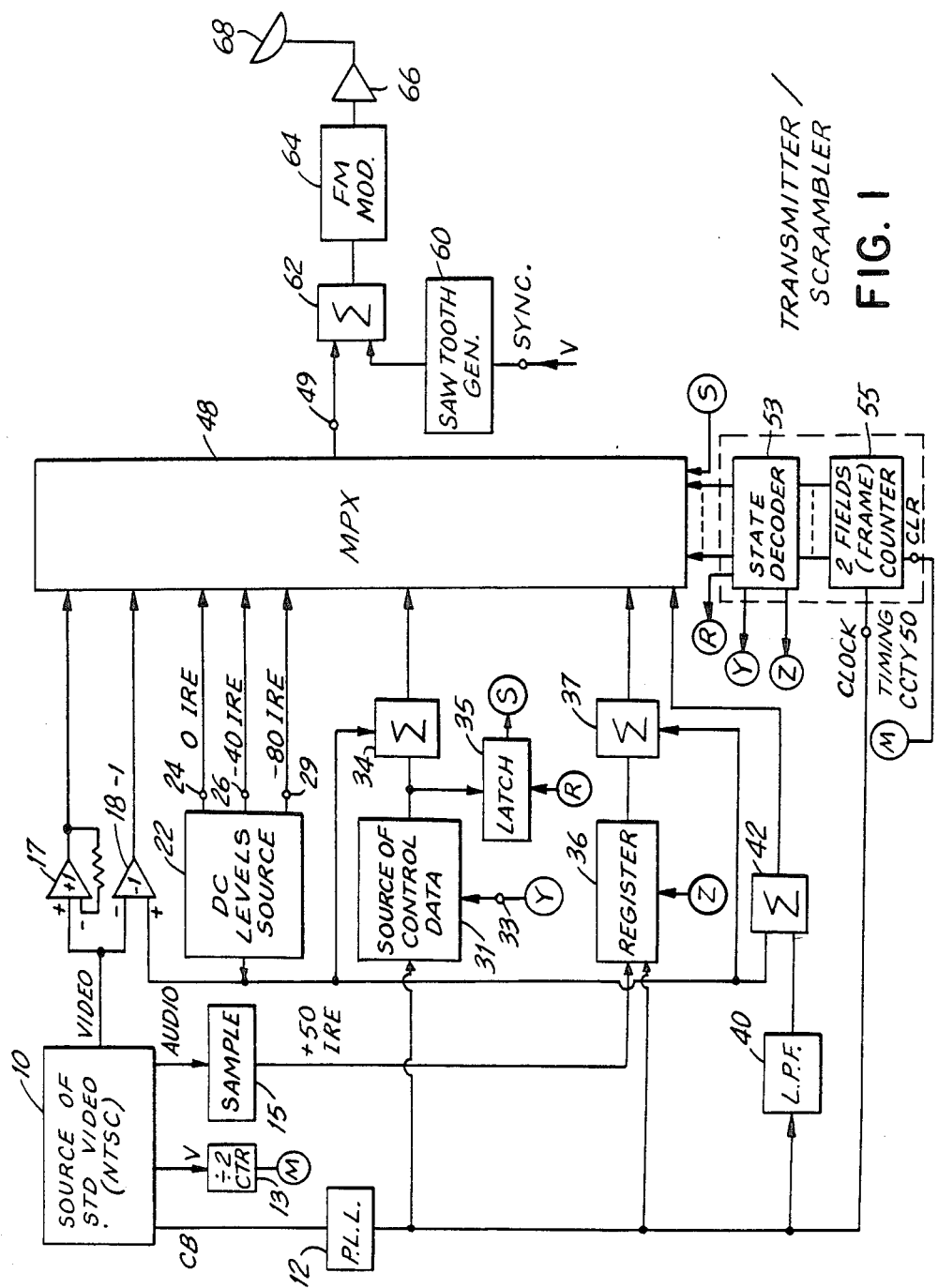
FIG. 1 is a block diagram depicting signal encoding (scrambling) transmitting or origination station apparatus.

Considering first the system in overview, it is one desideratum of the present invention to generate and distribute television programming in a form unrecoverable by a conventional television receiver. To this end, in addition to line inversion scrambling mechanisms discussed below, the radiated video signal is stripped of horizontal and vertical synchronizing pulses. Accordingly, a conventional television set cannot recover and display the video information conveyed. The radiated signal is supplemented with sufficient information from which an appropriately equipped receiver apparatus (e.g., that of FIG. 2) can reconstitute the video signal timing and thus generate and properly reinsert the requisite horizontal and vertical synchronizing information. More specifically, a large pulse (e.g., at the $-80$ IRE level) is inserted during the video portion of one line of each field of a composite video frame during the vertical synchronizing interval. The selection is arbitrary and may comprise, for example, a portion of the video information for line 1 of each first (odd) field and line 7 of each second (even) field of a frame (hence both occurring in the vertical synchronizing interval). Further, a special, predetermined synchronized digital code word (e.g., twenty four bits arranged in three eight-bit bytes) is transmitted during the video portion of one line of one field of the frame during the vertical interval, e.g., line 4 of the first odd field. Accordingly, there exists a known timed relation between each of the assumed $-80$ IRE pulses and the one synchronizing code word of each frame.

At each receiving station equipped with apparatus to permit reception of signals generated in accordance with the instant invention, a peak detector is employed to signal the incidence of each recovered $-80$ IRE locking pulse. After receiving one such pulse (it being unknown whether this was the pulse occurring at lien 1, field 1 or line 7, field 2 of a subject frame) synchronizing word seeking gating windows are generated at the appropriate times following a field 1 or field 2 locking pulse. Assuming that the transmitted snychronizing word is recovered during one such window time period, the receiver knows precisely the relative timing of the received frame. Appropriate receiver-timing synchronization pulses may thus be generated at the receiver to permit signal reception via a standard receiver. The receiver may continue to verify timing by looking for the expected recurring synchronizing word at the appropriate time each frame, maintaining synchronization providing that the synchronizing word is in fact detected when expected. Alternatively and preferably, synchronization is maintained if any substantial part of the synchronizing word is present at the receiver during the verification interval.

The foregoing discussion has focused upon signal reception timing and the regeneration of horizontal and vertical synchronizing pulses to permit signal reception. In accordance with one aspect of the instant invention, signal security is enhanced by transmitting the video information for a substantial subset (e.g., 50%) of the transmitted video lines in inverted format, i.e., inverted about a reference voltage level intermediate the white and black levels (e.g., about $+50$ IRE). The effect of such a selective line inversion, of course, is to change black video content to white and vice versa. When done selectively on a line by line basis, this by itself, even in the presence of synchronizing pulses, renders the incoming video essentially unrecoverable. A full discussion of such a selective video inversion system is set forth in a pending application of Clyde Robbins, Ser. No. 502,958 filed June 10, 1983, the disclosure of which is hereby incorporated herein by reference. In such a system, the inversion reference (i.e., the assumed +50 IRE voltage) is transmitted with the video wave to provide a measure of the reinversion level at the receiver. The aforementioned co-pending application transmits the reference level as a pulse during the horizontal synchronizing interval. In accordance with the instant invention, the inversion level is transmitted as the average value of a digital data stream transmitted each horizontal synchronization interval and may thus be derived at the receiver. In view of the disclosure in the aforementioned co-pending application, video inversion encryption will not be discussed in detail. Suffice it for present purposes to note that the inversion/non-inversion decision may be effected in any manner per se known to those skilled in the art and disclosed, for example, in the Robbins application. Such inversion may occur in accordance with a predetermined sequence of lines to be inverted; may be on an alternating line basis; or may be controlled by random or pseudo-random generators synchronized at the transmitting and receiving locations. In accordance with one aspect of the present invention, one bit of the data word communicated by the transmitter or head end apparatus each horizontal sync period characterizes the inverted/non-inverted status of the video signal for that line.

Figure 4:
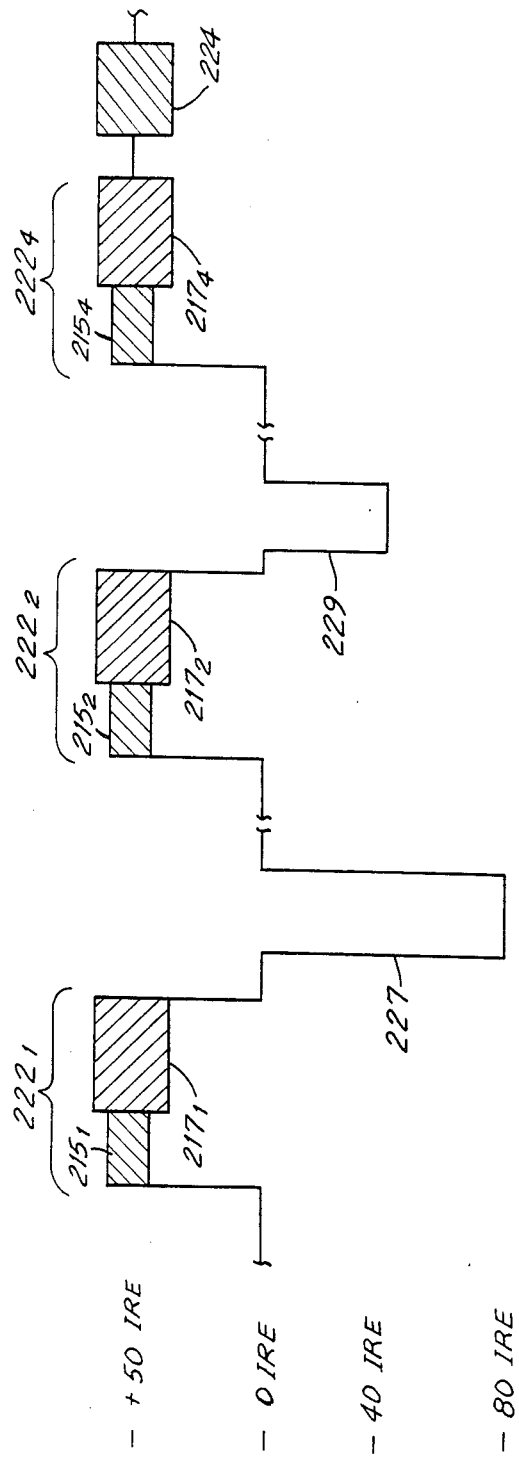

The above-described overview of the wave forms associated with the signal transmission of the instant invention is illustrated in FIGS. 3A, 3B and 4. FIG. 3A shows a portion of a video wave bridging one horizontal synchronizing interval for a standard NTSC wave. Video information from a preceding line 202 terminates at the 0 IRE pulse level 204 which is followed by a −40 IRE horizontal synchronization pulse 205. A 3.58 mhz color burst 207 at a 0 IRE average porch level next occurs followed by the video information 210 characterizing picture information for the following line.

Correspondingly, FIG. 3B depicts the information associated with a like period of time in accordance with the instant invention. The end portion 202 of the video information from the assumed preceding line is followed by a run-in 3.58 mhz color burst frequency wave 215 having an average value 214 of +50 IRE. The color burst frequency wave component 215 is succeeded by a series of data bits 217 of any format, e.g., non-return-to-zero coding also having an average value of +50 IRE units which extends to the video information 210 of the following line. The video information passages 202 and 210 in FIG. 3B may be inverted or non-inverted. The color burst and data fields 215 and 217 are sometimes referred to collectively as the "data message" below.

The digital message field 217 occurring during each horizontal sync interval conveys all requisite picture and system data. For example, the digital information included in the composite message 217 may contain address information and messages designated for specific system subscribers or subscriber sub-classes; digitized program audio for one or two (e.g., stereo) channels; and a digit above discussed designating whether the following line video is transmitted in normal or inverted format. Additional bits may be employed for services of interest to each individual system proprietor. Thus, for example, the digits may contain private message information if the system is operated in part as a common or dedicated carrier.

FIG. 4 depicts the first several line periods in the vertical retrace interval for the first (odd) field of each video frame depicting the scrambled video re-synchronizing signals above discussed. A number of the composite data message fields 222 (FIG. 3B) are transmitted during normal horizontal synchronizing intervals. The −80 IRE locking pulse occurs during the video portion of the first line; and the digital code burst 224 which corresponds to the preselected synchronizing word is sent during its alotted time slot during the video period of the fourth line, first field. A −40 IRE pulse 229, employed at the receiver to regenerate synchronizing pulse tip voltage levels is transmitted during the line two video period. As above noted, the time-of-transmission of the synchronizing signal surrogates is arbitrary and the times chosen herein are merely examples for specificity of illustrative presentation and are not limiting.

Accordingly, to reiterate and to conclude the overview discussion, vertical and horizontal synchronizing pulses are omitted from the wave transmitted in accordance with the instant invention. In its place markers (e.g., −80 IRE pulses 227) are transmitted once each field; and a synchronizing code word 224 is transmitted once each frame in a known time relation with the two marker pulses. At the receiver a peak detector locates the marker pulses, and receiver-transmitter synchronization is established when the synchronizing word 224 is detected at an appropriate delay after the detected marker pulse. A synchronization lock is maintained as long as the frame-recurring synchronizing word 224 occurs in whole or in part in its proper time slot each frame after synchronization is established.

Video information may be selectively inverted for scrambling purposes. The inversion level is transmitted as the average (D.C.) amplitude of the color burst frequency bit-timing wave 215 and the data 217. The data messages 217 contain a component identifying when a line is or is not inverted, and reinversion occurs as appropriate at the receiver.

Figure 2:
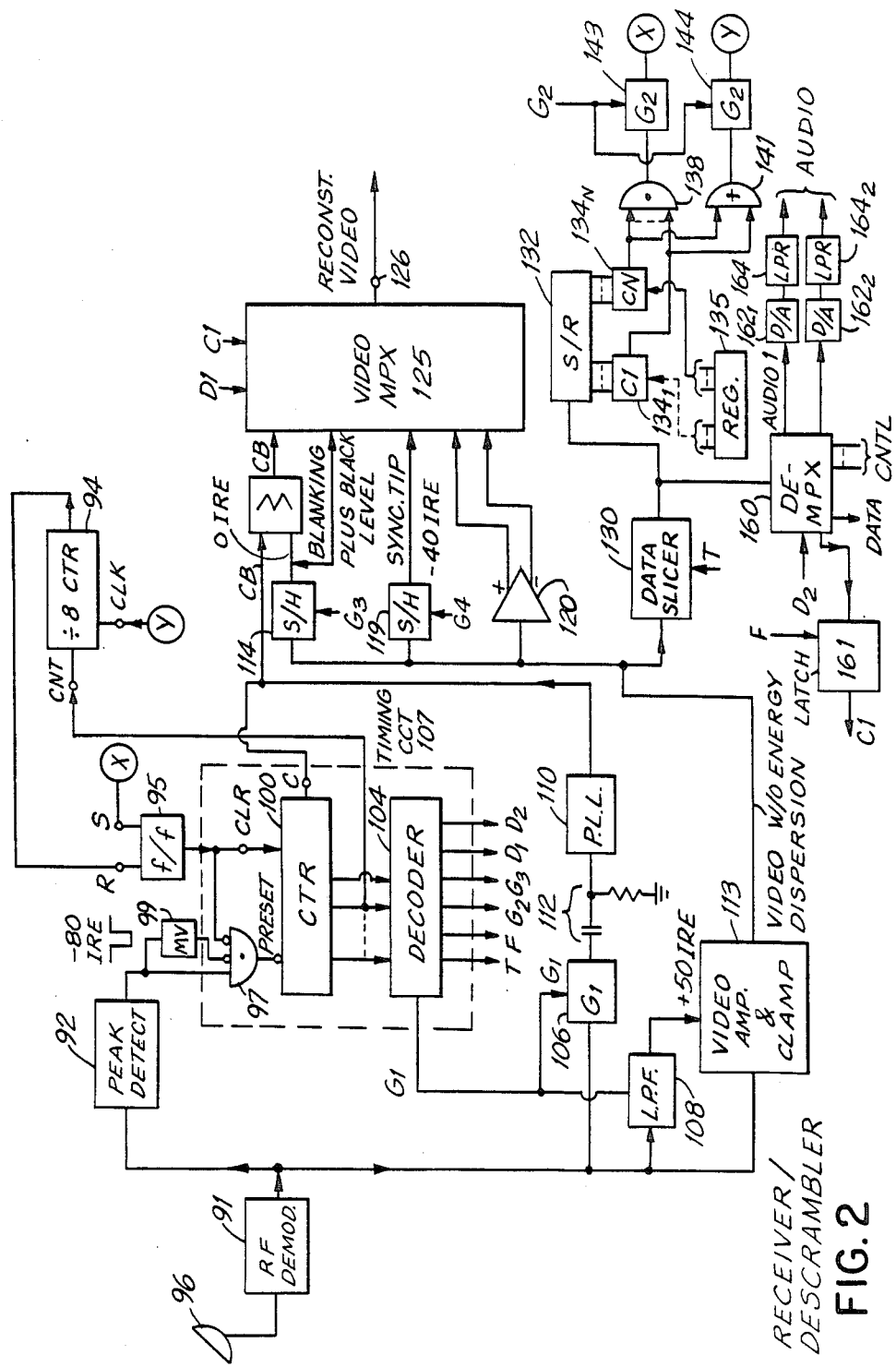
FIG. 2 is a block diagram of receiver apparatus for recovering and descrambling the video information developed by the FIG. 1 transmitter.

Finally, before discussing the block diagram apparatus of FIGS. 1 and 2 in detail, it is observed that the video wave of the instant invention may be distributed by frequency modulating a carrier followed by satellite repeater transmission. Unless steps are taken to vary the base band levels, there is an energy concentration about the Bessel function frequencies associated with the video picture and sound carrier which may cause interference with other radio services, e.g., terrestrial microwave. To this end, the base band wave of the instant invention (typified by FIGS. 3B and 4) is varied about a mean level in accordance with any desired wave form, a symmetrical triangular wave. This spreads the transmitted energy over a substantial frequency range, thus minimizing interference with other radio services. At the receiver, of course, the triangular or other wave employed is removed to restore the recovered base band signal to the transmitted format.

With the above system overview in mind, specific attention will now be directed to the transmitter and receiver apparatus of FIGS. 1 and 2 for respectively developing and recovering the signals above discussed. Examining first the transmitter of FIG. 1, a source of standard television program 10 supplies color burst pulses to a phase lock loop 12 which generates at its output a continuous wave at the 3.58 mhz color subcarrier frequency. This 3.58 mhz signal is used as the basic bit-frequency for the data fields 217 of the instant invention; and is also used as a clock frequency to subdivide the overall period (1/30-th of a second) corresponding to one composite video frame. The output of the phase locked loop 12 is supplied as a clock input to a two fields-long frame counter 55 forming part of the composite transmitter timing circuitry 50. The output signals from counter 55 are supplied to a counter-state decoder 53 which provides output signals characterizing all relevant sub-periods during the two fields constituting each video frame. The counter 55 is cleared once each frame by the output of a divide by two counter 13 acting upon the vertical synchronizing pulses supplied by the video signal source 10. A D.C. level source 22 generates all of the output levels required to generate the outgoing signal of FIGS. 3B and 4, i.e., the voltage levels corresponding to +50 IRE, 0 IRE, −40 IRE and −80 IRE As a final basic signal source for the FIG. 1 apparatus, a source of control data 31 generates the serial digital information required by the system operator (viz., the digital information for the data fields 217 (not otherwise provided) and the synchronizing word 224).

As an overall matter, the signals required for transmission during various times of each frame are furnished as inputs to an analog multiplexer 48. Under control of selected outputs of the transmitter timing circuitry 50 (from state decoder 53), the multiplexer operatively connects the appropriate input to its common output node 49 to develop the outgoing signal. To review the inputs to the multiplexer 48, the program picture information from the source 10 is supplied to the multiplexer 48 in non-inverted and inverted form via non-inverting and inverting difference (e.g., operational) amplifiers 17 and 18 (again, see the co-pending Robbins application). The 0 IRE, −40 IRE and −80 IRE D.C. levels are directly communicated to multiplexer 48 inputs by the D.C. levels source 22. The digital information making up most of the digital word 217 generated by the source of control data 31 is supplied to the input of a voltage summing (linear combining) network 34, together with the +50 IRE level potential such that the output of summer 34 communicated to multiplexer 48 is the digital information alternating about a mean value of +50 IRE. The digital information is actuated during the horizontal synchronizing intervals under control of the timing circuitry 50 (in particular, the counter state decoder 53) at a source 31 activating control port 33. A latch 35 is loaded with the outgoing message bit which characterizes the inversion/non-inversion status of the following video line and this stored bit (a control variable "S") becomes an additional addressing variable for the multiplexer 48 designating whether the output of amplifier 17 or 18 is to be selected during the video period. Alternatively, the output of latch 35 may control an analog gate having the outputs of amplifiers 17 and 18 supplied as inputs thereto such that a single video signal is supplied to multiplexer 48 for operative selection during each active line.

The audio content of the television programming supplied by source 10 is sampled by a sampling network 15 and the audio samples stored in a shift register 36. During an appropriate time within the digital message field 217 during which audio information is to be transmitted, timing circuitry 50 issues an enabling ("Z") signal such that the output of register 36 is operatively clocked out (3.58 mhz from phase locked loop 12) and is selected by multiplexer 48 for insertion in the output wave at multiplexer 48 output terminal 49. The output of audio signal register 36 passes through a summing network 37 which also receives the +50 IRE level to generate the desired mean value matching the remainder of the composite digital messages 217.

Finally, the square wave output of phase locked loop 12 is converted to sinusoidal form by a low pass filter 40 and is offset to the +50 IRE average value in summing network 42 to form an analog input to multiplexer 48 to be selected at the beginning interval of each horizontal line interval to generate the signal 222 component 215 shown in FIGS. 3B and 4.

Each of the analog input signals to the multiplexer 48 is operatively selected during its appropriate period each frame under control of the timing circuitry 50 as above discussed. To review, the −80 IRE level passes to the multiplexer output 49 during the video intervals for the first and seventh lines of odd and even fields (the assumed format); the +50 IRE offset color burst is selected at the beginning of each horizontal interval, followed by the data message 217 constituting an interleaving of the output of summing networks 34 and 37; the −40 IRE synchronizing pulse tip level is communicated (e.g., FIG. 4) during the second line; and the video output of amplifier 17 or 18 appears at multiplexer output 49 during the active video portion of each line.

The composite video wave output of multiplexer 48 is supplied to one input of a base band-dithering summing network 62, the second input of which receives a symmetrical A.C. triangular wave output of a saw tooth (triangular wave) generator. The output of summing network 62 thus comprises the base band information typified by FIGS. 3B and 4, but varied in a symmetrical manner to effect post-modulation energy distribution as above discussed. The base band output signal of summing network 62 passes to any desired output distribution medium, e.g., after modulation to a cable or radiating antenna. Where cable or other distribution medium free of interference problems is employed, the generator 60 and summing network 62, of course, may be omitted. Assuming, however, a satellite distribution for the instant television service, the elements 60 and 62 are utilized, and the perturbated base band signal is frequency modulated in a modulator 64. The modulated carrier is then amplified (power amplifier 66) and supplied to an antenna 68 for up-link coupling to the satellite repeater.

Turning now to FIG. 2, there is shown receiver apparatus for recovering the signal generated and distributed by the FIG. 1 transmitter as via a communications satellite. The incoming signal is recovered and frequency demodulated in receiver front end apparatus 91, and supplied to the respective functional sub-circuits below discussed. As a first matter for signal recovery, synchronization must be established at the receiver for the various frame constituents of the incoming signal. To this end peak detector 92 supplies output signals corresponding to the time when the −80 IRE (largest negative relative polarity component of the incoming signal) occurs. As synchronization is being established, the first recovered such pulse passes through an otherwise enabled AND gate 97 and presets a counter 100 forming part of the receiver timing circuitry 107. Receiver timing circuitry 107 corresponds to the circuitry 50 at the receiver and employs a counter 100 and counter-state decoder 104 to signal all of the relevant periods during each recurring frame. Counter 100 advances at the color subcarrier frequency (3.58 mhz), driven by a phase locked loop 110. Timing circuit 107 at the receiver supplies a first gating ("G1") signal during the recurring periods 215 of FIG. 3B when the color burst frequency is being transmitted. An A.C. coupling network 112 strips the pulsed 3.58 mhz from the +50 IRE bias to synchronize the phase locked loop 110 which thus supplies the color frequency on a continuous wave basis.

The composite received base band signal with the triangular or other periodic variation is supplied to the input of a video amplifier and clamp 113. Also supplied to the clamp 113 is the triangular wave varied known +50 IRE level (signal components 215 ("G1" gating period) having the sinusoidal color burst override removed by a low pass filter 108). The received composite signal is then clamped at the connected, constant +50 IRE level on a line-by-line basis, hence removing the effect of the triangular or other base band variation and restoring the video wave to its FIG. 3B-4 form at the output of amplifier and clamp 113.

Continuing with the establishment of synchronization, the output of the amplifier and the clamp circuit 113 is supplied to sampling, data slicer circuitry 130 which is operative during the periods corresponding to data transmission intervals 217 ("T" timing from circuit 107) such that the received data 217 flows into a shift register 132. The outputs of the shift registers 132 form one set of inputs to a composite binary comparator 134 which look for the special synchronizing word 224 (e.g., three 8-bit comparators $134_1$–$134_3$ for the assumed 3-byte, 24-bit synchronizing word). Supplied as a second input to the comparator 134 is the predetermined synchronizing word which forms the fixed content of a register 135.

The three outputs of the ensemble of comparators 134 are supplied as input to an AND gate 138 which is fully enabled when and only when each of the comparators detects a match between the complete contents of the shift register 132 and the register 134. Accordingly, AND gate 138 signals when the synchronizing word is contained in shift register 132. A timing signal "G2" is developed by timing circuit 107 for the two synchronizing word seeking window periods, i.e., for the periods between the −80 IRE pulses in the odd and even frame fields and the synchronizing word 224. Assuming that the synchronizing pulse appears in one of the two windows, the then enabled AND gate 138 output passes through a gate 143 and sets a sync lock flip flop 95 clearing counter 100 to its then known state, i.e., the time within the frame when synchronizing word 224 occurs. Synchronization is thus achieved and video reception proceeds under control of the lock-establishing timing circuit 107. The output of the set lock flip flop 95 is coupled to an inverting input on AND gate 97 to lock out the following −80 IRE pulses uncovered by the peak detector 92. A one-shot circuit 99 (e.g., a monostable multivibrator) is employed to similarly block the AND gate 97 for a one field interval to permit synchronization to be achieved following either received −80 IRE pulse.

To maintain synchronization, the outputs of the three comparators 134 are coupled to an OR gate 141, the output of which passes through a gate 144 during periods associated with the synchronizing word 224 of FIG. 4 ("G2" timing). This OR gate output passing through element 144 is employed to clear a divide-by-eight counter 94. The count input of counter 94 advances once each frame via an output signal from circuit 107. If eight frames occur without an intervening counter 94 clearing output pulse from gate 144, counter 94 will overflow and reset flip flop 95. This signifies that synchronization has been lost, thereby once again enabling AND gate 97. The next following detected −80 IRE pulse will act in the manner above-described to seek a new synchronization lock.

However, assuming that one of the three comparators 134 detected the synchronization word at the appropriate word 224 time, the enabled OR gate 141 acts through gate 144 to clear the counter 94 once each frame such that the counter 94 will never overflow. The synchronization lock-signifying flip flop 95 thus remains set as long as synchronization remains verified. It of course would be possible to use the output of And gate 138 to maintain as well as to establish synchronization (i.e., as the operative signal to clear counter 94). This is a more severe criteria than the "OR" logic output actually employed. Experience has suggested that system performance is improved by requiring a full synchronizing word recognition to establish synchronization lock but only partial recognition to maintain synchronization such that synchronization is not surrendered in the face of noise perturbations or the like.

Having discussed receiver synchronizing capture above, a video multiplexer 125 reconstructs the requisite wave in standard NTSC format recoverable by a standard receiver in a manner directly analogous to the operations effected in the FIG. 1 transmitter. In very brief terms, the various signal constituents are supplied as inputs to the analog video multiplexer 125 which selects the appropriate constituent for time assembly into the serial wave train at the multiplexer output 126. The video information in non-inverted and inverted form is supplied to the multiplexer 125 as from the polarity inverting and non-inverting outputs of a paraphase amplifier 120. The received video wave (with the energy dispersal wave form removed—again, typifed by FIGS. 3B and 4) is sampled in a sample and hold circuit 119 during the frame time interval corresponding to pulse 229 of FIG. 40("G4" output of timing circuit 107) to supply the −40 IRE level to the multiplexer 125. The front and back synchronizing pulse interval porches (0 IRE LEVEL) are detected by a sample and hold circuit 114 (G3 timing corresponding to the blanked video picture level during the vertical interval) supplying black, blanking level. This 0 IRE signal is also supplied to a summing network 115, together with the color frequency signal, to supply the color burst FIG. 3A wave form component 207 to the multiplexer. Multiplexer addressing inputs ("C1" for the received and stored (latch 161) video inversion/non-inverting bit, and addressing signals D1 from timing circuit 107) cause the multiplexer to select the appropriate wave constituent from the ensemble of inputs such that the standard television wave of FIG. 3A is developed at the output 126 of the multiplexer 125. The reconstituted video information, in standard NTSC format, is thus available at the multiplexer output port 126 for connection to the input port of a standard receiver.

A data 217 receiving demultiplexer 160 is actuated by "D2" operative gating signal from timing circuit 107 to recover and distribute the incoming data 217 bits as appropriate. The stereo audio bits within the digital word 217 received each horizontal synchronizing period are converted to analog form in digital-to-analog converters 162, pass through low pass filter for smoothing, and are available for audio presentation. The inversion/non-inversion video bit is stored in the latch 161 activated at the appropriate time ("F" signal timing from circuit 107), and coupled as an addressing input to the video multiplexer 125 as above-described. The ensemble of other control and/or informational signals ("CNTL") are present at demultiplexer 160 outputs and are used for their intended system purposes.

The above-described apparatus and methodology has thus been shown to encrypt a video wave to a format unrecoverable by a standard television receiver; and to permit reception of the encrypted signal by subscriber stations authorized to receive the informatted transmitted signal. The system is operative, moreover, in a manner to effect energy dispersal for satellite distribution.

The above-described arrangement is merely illustrative of the principles of the present invention. Numerous modifications and adaptations thereof will be readily apparent to those skilled in the art without departing from the spirit and scope of the present invention.

What is claimed is:

1. In combination in an encrypted video distribution system; television signal originating encrypting means including means for transmitting a composite video signal comprising a plurality of frames, each said frame subdivided into a plurality of fields by a vertical interval, each said field comprising a plurality of lines separated by horizontal synchronizing intervals, and including within each frame first and second marker signals having a predetermined time dependency therebetween, said composite video signal not including vertical or horizontal synchronizing signals ; and at least one signal receiver means for receiving the transmitted composite video signal and for restoring horizontal and vertical synchronizing signals thereto to render said video signal presentable via a standard television receiver, said receiver means including frame clock and timing means, first detector means for detecting said first marker signal, second, timed detector means responsive to said first detector means detecting said first marker signal for selectively detecting said second marker signal said dependent, predetermined time after said first marker signal for setting said receiver frame clock and timing means to a state corresponding to the time of origination of said second marker signal; said setting of said receiver frame clock and timing means including means for locking out said first marker signal after each detection of said second marker signal.

2. A combination as in claim 1, wherein said first marker signal comprises a pulse of predetermined amplitude generated during the vertical interval of of each field.

3. A combination as in claim 2, wherein said first marker signal comprises two pulses occurring each frame and said second marker signal comprises a predetermined synchronizing code word, and wherein said two pulses forming said first marker signal and said second marker signal occur during the video information portions of lines in the vertical interval.

4. A combination as in claim 2, wherein said pulse occurs during different lines of the vertical interval.

5. A combination as in claim 4, wherein said first marker signal comprises two pulses occurring each frame and said second marker signal comprises a predetermined synchronizing code word, and wherein said two pulses forming said first marker signal and said second marker signal occur during the video information portions of lines in the vertical interval.

6. In combination in an encrypted video distribution system; television signal originating encrypting means including means for transmitting a composite video signal comprising a plurality of frames, each said frame subdivided into a plurality of fields by a vertical interval, each said field comprising a plurality of lines separated by horizontal synchronizing inntervals, including within each frame first and second marker signals having a predetermined time dependency therebetween, said composite video signal not including vertical or horizontal synchronizing signals ; and at least one signal receiver means for receiving the transmitted composite video signal and for restoring horizontal and vertical synchronizing signals thereto to render said video signal presentable via a standard television receiver, said receiver means including frame clock and timing means, first detector means for detecting said first marker signal, second, timed detector means responsive to said first detector means detecting said first marker signal for selectively detecting said second marker signal said dependent, predetermined time after said marker signal for setting said receiver frame clock and timing means to a state corresponding to the time of origination of said second marker signal, said setting of said receiver frame clock and timing means including means for locking out said first marker signal after each detection of said second marker signal; wherein said television signal originating encryption means includes an analog multiplexer having plural inputs and an output, transmitter timing means for selectively inter-connecting said multiplexer inputs to the multiplexer output, and means for supplying varying IRE voltage levels to different multiplexer inputs.

7. A combination as in claim 6 further comprising means for supplying a color subcarrier frequency signal, said voltage level supplying means including means for supplying an inversion level potential, means having an output connected to an input of said multiplexer for supplying to said multiplexer said color subcarrier frequency superimposed upon said inversion level potential, said transmitter timing means operatively connecting said color subcarrier frequency combined with inversion level potential to said multiplexer output during horizontal synchronizing intervals.

8. In combination in an encrypted video distribution system; television signal originating encrypting means including means for transmitting a composite video signal comprising a plurality of frames, each said frame subdivided into a plurality of fields by a vertical interval, each said field comprising a plurality of lines separated by horizontal synchronizing intervals, including within each frame first and second marker signals having a predetermined time dependency therebetween, said composite video signal not including vertical or horizontal synchronizing signals ; and at least one signal receiver means for receiving the transmitted composite video signal and for restoring horizontal and vertical synchronizing signals thereto to render said video signal presentable via a standard television receiver, said receiver means including frame clock and timing means, first detector means for detecting said first marker signal, second, timed detector means responsive to said first detector means detecting said first marker signal for selectively detecting said second marker signal said dependent, predetermined time after said first marker signal for setting said receiver frame clock and timing means to a state corresponding to the time of origination of said second marker signal, said setting of said receiver frame clock and timing means including means for locking out said first marker signal after each detection of said second marker signal; wherein said television signal originating encryption means includes an analog multiplexer having plural inputs and an output, transmitter timing means for selectively inter-connecting said multiplexer inputs to the multiplexer output, and means for supplying varying IRE voltage levels to different mutltplexer inputs; further comprising means for selectively inverting video picture information about an inversion reference IRE level intermediate black and white levels, means for selectively coupling non-inverted or inverted video to said multiplexer output each line, and means for providing a measure of said reference inversion level at said multiplexer output.

9. A combination as in claim 7, further comprising means for supplying a color subcarrier frequency signal, said voltage level supplying means including means for supplying an inversion level potential, means having an output connected to an input of said multiplexer for supplying to said multiplexer said color subcarrier frequency superimposed upon said inversion level potential, said transmitter timing means operatively connecting said color subcarrier frequency combined with said inversion level potential to said multiplexer output during horizontal synchronizing intervals.

10. A combination as in claim 8, wherein said receiver means includes means for recovering said inversion reference IRE level during horizontal synchronizing intervals, difference amplifier means for generating a non-inverted picture signal and a picture signal inverted about the recovered inversion reference level, means for recovering and storing information characterizing the inverted or non-inverted status of each received video line, and means responsive to said receiver frame clock and timing means and to said means for recovering and storing information for selectively connecting an inverted or non-inverted form of video to said receiver multiplexer output.

11. In combination in an encrypted video distribution system; television signal originating encrypting means including means for transmitting a composite video signal comprising a plurality of frames, each said frame subdivided into a plurality of fields by a vertical interval, each said field comprising a plurality of lines separated by horizontal synchronizing intervals, including within each frame first and second marker signals having a predetermined time dependency therebetween, said composite video signal not including vertical or horizontal synchronizing signals ; and at least one signal receiver means for receiving the transmitted composite video signal and for restoring horizontal and vertical synchronizing signals thereto to render siad video signal presentable via a standard television receiver, said receiver means including frame clock and timing means, first detector means for detecting said first marker signal, second, timed detector means responsive to said first detector means detecting said first marker signal for selectively detecting said second marker signal said dependent, predetermined time after said first marker signal for setting said receiver frame clock and timing means to a state corresponding to the time of origination of said second marker signal, said setting of said receiver frame clock and timing means including means for locking out said first marker signal after each detection of said second marker signal; wherein said television signal originating encryption means includes an analog multiplexer having plural inputs and an output, transmitter timing means for selectively inter-connecting said multiplexer inputs to the multiplexer output, and means for supplying varying IRE voltage levels to different multiplexer inputs; further comprising means for supplying a color subcarrier frequency signal, said voltage level supplying means including means for supplying an inversion level potential, means having an output connected to an input of said multiplexer for supplying to said multiplexer said color subcarrier frequency superimposed upon said inversion level potential, said transmitter timing means operatively connecting said color frequency combined with said inversion level potential to said multiplexer output during horizontal synchronizing intervals.

12. A combination as in claim 11, wherein said receiver means includes means for recovering said inversion reference IRE level during horizontal synchronizing intervals, difference amplifier means for generating a non-inverted picture signal and a picture signal inverted about the recovered inversion reference level, means for recovering and storing information characterizing the inverted or non-inverted status of each received video line, and means responsive to said receiver frame clock and timing means and to said means for recovering and storing information for selectively connecting an inverted or non-inverted form of video to said receiver multiplexer output.

13. In combination in an encrypted video distribution system; television signal originating encrypting means including means for transmitting a composite video signal comprising a plurality of frames, each said frame subdivided into a plurality of fields by a vertical interval, each said field comprising a plurality of lines separated by horizontal synchronizing intervals, including within each frame first and second marker signals having a predetermined time dependency therebetween, said composite video signal not including vertical or horizontal synchronizing signals ; and at least one signal receiver means for receiving the transmitted composite video signal and for restoring horizontal and vertical synchronizing signals thereto to render said video signal presentable via a standard television receiver, said receiver means including frame clock and timing means, first detector means for detecting said first marker signal, second, timed detector means responsive to said first detector means detecting said first marker signal for selectively detecting said second marker signal said dependent, predetermined time after said first marker signal for setting said receiver frame clock and timing means to a state corresponding to the time of origination of said second marker signal, said setting of said receiver frame clock and timing means including means for locking out said first marker signal after each detection of said second marker signal; wherein said television signal originating encryption means includes an analog multiplexer having plural inputs and an output, transmitter timing means for selectively inter-connecting said multiplexer inputs to the multiplexer output, and means for supplying varying IRE voltage levels to different multiplexer inputs; further comprising a digital data source, said voltage level supplying means including means for supplying an inversion level potential, summing means having an output connected to an input of said multiplexer for supply to said multiplexer the digital information supplied by said data source superimposed upon said inversion level potential supplied by said voltage level supplying means, said transmitted timing means operatively connecting said digital information combined with said inversion level potential to said multiplexer output during horizontal synchronizing intervals.

14. A combination as in claim 10, further comprising means for storing information characterizing a transmitted video line as being inverted or non-inverted, said means for storing information having an output connected to said multiplexer for operatively selecting the inverted or non-inverted video line for outputting at said multiplexer output.

15. A combination as in claim 13, wherein said receiver means includes means for recovering said inversion reference IRE level during horizontal synchronizing intervals, difference amplifier means for generating a non-inverted picture signal and a picture signal inverted about the recovered inversion reference level, means for recovering and storing information characterizing the inverted or non-inverted status of each received video line, and means responsive to said receiver frame clock and timing means and to said means for recovering and storing information for selectively connecting an inverted or non-inverted form of video to said receiver multiplexer output.

16. In combination in an encrypted video distribution system; television signal originating encrypting means including means for transmitting a composite video signal comprising a plurality of frames, each said frame subdivided into a plurality of fields by a vertical interval, each said field comprising a plurality of lines separated by horizontal synchronizing intervals, including within each frame first and second marker signals having a predetermined time dependency therebetween, said composite video signal not including vertical or horizontal synchronizing signals ; and at least one signal receiver means for receiving the transmitted composite video signal and for restoring horizontal and vertical synchronizing signals thereto to render said video signal presentable via a standard television receiver, said receiver means including frame clock and timing means, first detector means for detecting said first marker signal, second, timed detector means responsive to said first detector means detecting said first marker signal for selectively detecting said second marker signal said dependent, predetermined time after said first marker signal for setting said receiver frame clock and timing means to a state corresponding to the time of origination of said second marker signal, said setting of said receiver frame clock and timing means including means for locking out said first marker signal after each detection of said second marker signal; further comprising means for varying said composite video signal about mean value, and transmission means including frequency modulating means.

17. In combination in an encrypted video distribution system; television signal originating encrypting means including means for transmitting a composite video signal comprising a plurality of frames, each said frame subdivided into a plurality of fields by a vertical interval, each said field comprising a plurality of lines separated by horizontal synchronizing intervals, including within each frame first and second marker signals having a predetermined time dependency therebetween, said composite video signal not including vertical or horizontal synchronizing signals ; and at least one signal receiver means for receiving the transmitted composite video signal and for restoring horizontal and vertical synchronizing signals thereto to render said video signal presentable via a standard television receiver, said receiver means including frame clock and timing means, first detector means for detecting said first marker signal, second, timed detector means responsive to said first detector means detecting said first marker signal for selectively detecting said second marker signal said dependent, predetermined time after said first marker signal for setting said receiver frame clock and timing means to a state corresponding to the time of origination of said second marker signal, wherein said first marker signal comprises a pulse of predetermined amplitude generated during the vertical interval of each frame of each field, wherein said receiver means comprises means for detecting said predetermined amplitude marker pulses, wherein said receiver frame clock and timing means includes a counter selectively set by said second, timed detector means, said second, timed detector means including a shift register, synchronizing word register means containing said second marker signal, and comparator means having inputs connected to said shift register and said synchronizing word register means and an output coupled to said receiver frame clock and timing means, said output being responsive to said shift register and said synchronizing word register means during said time dependent period between said first and second marker pulses.

18. In combination in an encrypted video distribution system; television signal originating encrypting means including means for transmitting a composite video signal comprising a plurality of frames, each said frame subdivided into a plurality of fields by a vertical interval, each said field comprising a plurality of lines separated by horizontal synchronizing intervals, including within each frame first and second marker signals having a predetermined time dependency therebetween, said composite video signal not including vertical or horizontal synchronizing signals ; and at least one signal receiver means for receiving the transmitted composite video signal and for restoring horizontal and vertical synchronizing signals thereto to render said video signal presentable via a standard television receiver, said receiver means including frame clock and timing means, first detector means for detecting said first marker signal, second, timed detector means responsive to said first detector means detecting said first marker signal for selectively detecting said second marker signal said dependent, predetermined time after said first marker signal for setting said receiver frame clock and timing means to a state corresponding to the time of origination of said second marker signal, said setting of said receiver frame clock and timing means including means for locking out said first marker signal after each detection of said second marker signal; wherein said television signal originating encryption means includes an analog multiplexer having plural inputs and an output, transmitter timing means for selectively inter-connecting said multiplexer inputs to the multiplexer output, and means for supplying varying IRE voltage levels to different multiplexer inputs; wherein said signal originating means further comprises means for transmitting synchronizing pulse tip level signals and wherein said receiver means includes a receiver analog multiplexer having plural inputs and an output, means for extracting from said received signal IRE voltage levels required for signal reconstruction, said receiver frame clock and timing means including means for controlling said receiver multiplexer for connecting appropriate voltage levels present at said receiver multiplexer inputs to said receiver multiplexer output to provide synchronizing pulses during the horizontal and vertical synchronizing intervals.

19. In combination in an encrypted video distribution system; television signal originating encrypting means including means for transmitting a composite video signal comprising a plurality of frames, each said frame subdivided into a plurality of fields by a vertical interval, each said field comprising a plurality of lines separated by horizontal synchronizing intervals, including within each frame first and second marker signals having a predetermined time dependency therebetween, said composite video signal not including vertical or horizontal synchronizing signals ; and at least one signal receiver means for receiving the transmitted composite video signal and for restoring horizontal and vertical synchronizing signals thereto to render said video signal presentable via a standard television receiver, said receiver means including frame clock and timing means, first detector means for detecting said first marker signal, second, timed detector means responsive to said first detector means detecting said first marker signal for selectively detecting said second marker signal said dependent, predetermined time after said first marker signal for setting said receiver frame clock and timing means to a state corresponding to the time of origination of said second marker signal, said setting of said receiver frame clock and timing means including means for locking out said first marker signal after each detection of said second marker signal, wherein said first marker signal comprises a pulse of predetermined amplitude generated during the vertical interval of each frame of each field, wherein said second marker signal comprises a predetermined synchronizing code word, and wherein the two pulses forming said first marker signal each video frame and said second marker signal occur during the video information portions of lines in the vertical interval, wherein said receiver means includes synchronization lock signalling storage means for controlling said receiver frame clock and timing means, said second, timed detector means further comprising means for setting said lock signalling storage means to a first binary state responsive to detecting the incidence of said predetermined synchronizing code word occurring at said predetermined dependency from said first marker signal, and means for resetting said synchronization locking storage means to a second binary state representing the absence of synchronization lock responsive to passage of a predetermined number of video frames without synchronization confirmation by said second, timed detector means.

20. A combination as in claim 19, wherein said second, timed detector means further includes means for maintaining said synchronization lock signalling storage means in said first binary state, said means for maintaining being responsive to detecting a predetermined subset of said synchronizing code word occurring in a time period alotted therefor.

21. In combination in receiver means for receiving a composite encrypted video signal comprising a plurality of frames, each said frame subdivided into a plurality of fields by a vertical interval, each said field comprising a plurality of lines separated by horizontal synchronizing intervals, including within each frame first and second marker signals having a predetermined time dependency therebetween, said composite video signal not including vertical or horizontal synchronizing signals; said receiver means receiving the transmitted composite video signal and restoring horizontal and vertical synchronizing signals thereto to render said video signal presentable via a standard television receiver, said receiver means including frame clock and timing means, first detector means for detecting the first marker signal, second, timed detector means responsive to said first detector means detecting the first marker signal for selectively detecting the second marker signal said dependent, predetermined time after said first marker signal for setting said receiver frame clock and timing means to a state corresponding to the time of origination of said second marker signal, said setting of said receiver frame clock and timing means including means for locking out said first marker signal after each detection of said second marker signal.

22. A combination as in claim 21, wherein said first marker signal comprises a pulse of predetermined amplitude generated during the vertical interval of each frame of each field.

23. A combination as in claim 22, wherein said pulse occurs during different lines of the vertical interval.

24. A combination as in claim 23, wherein said first marker signal comprises two pulses occurring each frame and said second marker signal comprises a predetermined synchronizing code word, and wherein said two pulses forming said first marker signal and said second marker signal occur during the video information portions of lines in the vertical interval.

25. A combination as in claim 24, wherein said second marker signal comprises a predetermined synchronizing code word, and wherein said two pulses forming said first marker signal and said second marker signal occur during the video information portions of lines in the vertical interval.

26. In combination in receiver means for receiving a composite encrypted video signal comprising a plurality of frames, each said frame subdivided into a plurality of fields by a vertical interval, each said field comprising a plurality of lines separated by horizontal synchronizing intervals, including within each frame first and second marker signals having a predetermined time dependency therebetween, said composite video signal not including vertical or horizontal synchronizing signals; said receiver means receiving the transmitted composite video signal and restoring horizontal and vertical synchronizing signals thereto to render said video signal presentable via a standard television receiver, said receiver means including frame clock and timing means, first detector means for detecting the first marker signal, second, timed detector means responsive to said first detector means detecting the first marker signal for selectively detecting the second marker signal said dependent, predetermined time after said first marker signal for setting said receiver frame clock and timing means to a state corresponding to the time of origination of said second marker signal; wherein said first marker signal comprises a pulse of predetermined amplitude generated during the vertical interval of each frame of each field; wherein said receiver means further comprises means for detecting said predetermined amplitude marker pulses, wherein said receiver frame clock and timing means includes a counter selectively set by said second, timed detector means, said second, timed detector means including a shift register, synchronizing word register means containing second marker signal, and comparator means having inputs connected to said shift register and said synchronizing word register means and an output coupled to said receiver frame clock and timing means, said output being responsive to said shift register and said synchronizing word register means during said time dependent period between said first and second marker pulses.

27. In combination in receiver means for receiving a composite encrypted video signal comprising a plurality of frames, each said frame subdivided into a plurality of fields by a vertical interval, each said field comprising a plurality of lines separated by horizontal synchronizing intervals, including within each frame first and second marker signals having a predetermined time dependency therebetween, said composite video signal not including vertical or horizontal synchronizing signals; said receiver means receiving the transmitted composite video signal and restoring horizontal and vertical synchronizing signals thereto to render said video signal presentable via a standard television receiver, said receiver means including frame clock and timing means, , first detector means for detecting the first marker signal, second, timed detector means responsive to said first detector means detecting the first marker signal for selectively detecting the second marker signal said dependent, predetermined time after said first marker signal for setting said receiver frame clock and timing means to a state corresponding to the time of origination of said second marker signal, said setting of said receiver frame clock and timing means including means for locking out said first marker signal after each detection of said second marker signal; wherein said first marker signal comprises pulses of predetermined amplitude generated during the vertical interval of each frame of each field; wherein said pulses occur during different lines of the vertical interval; wherein said second marker signal comprises a predetermined synchronizing code word, and wherein the two pulses forming said first marker signal each video frame and said second marker signal occur during the video information portions of lines in the vertical interval; wherein said composite encrypted video signal further includes plural IRE voltage levels including synchronizing pulse tip level signals, and wherein said receiver means includes a receiver analog multiplexer having plural inputs and an output, means for extracting from the received signal IRE voltage levels required for signal reconstruction, said receiver frame clock and timing means including means for controlling said receiver multiplexer for connecting appropriate voltage levels present at said receiver multiplexer inputs to said receiver multiplexer output to provide synchronizing pulses during the horizontal and vertical synchronizing intervals.

28. In combination in receiver means for receiving a composite encrypted video signal comprising a plurality of frames, each said frame subdivided into a plurality of fields by a vertical interval, each said field comprising a plurality of lines separated by horizontal synchronizing intervals, including within each frame first and second marker signals having a predetermined time dependency therebetween, said composite video signal not including vertical or horizontal synchronizing signals; said receiver means receiving the transmitted composite video signal and restoring horizontal and vertical synchronizing signals thereto to render said video signal presentable via a standard television receiver, said receiver means including frame clock and timing means, first detector means for detecting the first marker signal, second, timed detector means responsive to said first detector means detecting the first marker signal for selectively detecting the second marker signal said dependent, predetermined time after said first marker signal for setting said receiver frame clock and timing means to a state corresponding to the time of origination of said second marker signal, said setting of said receiver frame clock and timing means including means for locking out said first marker signal after each detection of said second marker signal; wherein said first marker signal comprises a pulse of predetermined amplitude generated during the vertical interval of each frame of each field; wherein said pulses occur during different lines of the vertical interval; wherein said second marker signal comprises a predetermined synchronizing code word, and wherein the two pulses forming said first marker signal each video frame and said second marker signal occur during the video information portions of lines in the vertical interval; wherein said composite signal includes video picture information selectively inverted about an inversion reference IRE level intermediate black and white levels, and a measure of said reference inversion level, wherein said receiver means further includes means for recovering said inversion reference IRE level during horizontal synchronizing intervals, difference amplifier means for generating a non-inverted picture signal and a picture signal inverted about the recovered inversion reference level, means for recovering and storing information characterizing the inverted or non-inverted status of each received video line, and means responsive to said receiver frame clock and timing means and to said means for storing and recovering information for selectively connecting an inverted or non-inverted form of video to said receiver multiplexer output.

29. In combination in receiver means for receiving a composite encrypted video signal comprising a plurality of frames, each said frame subdivided into a plurality of fields by a vertical interval, each said field comprising a plurality of lines separated by horizontal synchronizing intervals, including within each frame first and second marker signals having a predetermined time dependency therebetween, said composite video signal not including vertical or horizontal synchronizing signals; said receiver means receiving the transmitted composite video signal and restoring horizontal and vertical synchronizing signals thereto to render said video signal presentable via a standard television receiver, said receiver means including frame clock and timing means, first detector means for detecting the first marker signal, second, timed detector means responsive to said first detector means detecting the first marker signal for selectively detecting the second marker signal said dependent, predetermined time after said first marker signal for setting said receiver frame clock and timing means to state corresponding to the time of origination of said second marker, signal, said setting of said receiver frame clock and timing means including means for locking out said first marker signal after each detection of said second marker signal; wherein said first marker signal comprises a pulse of predetermined amplitude generated during the vertical interval of each frame of each field; wherein said pulses occur during different lines of the vertical interval; wherein said second marker signal comprises a predetermined synchronizing code word, and wherein the two pulses forming said first marker signal each video frame and said second marker signal occur during the video information portions of lines in the vertical interval; wherein said receiver means further includes synchronization lock signalling storage means for controlling said receiver frame clock and timing means, said second, timed detector means further comprising means for setting said lock signalling storage means to a first binary state responsive to detecting the incidence of said predetermined synchronizing code word occurring at said predetermined dependency from said first marker signal, and means for resetting said synchronization locking storage means to a second binary state representing the absence of synchronization lock responsive to passage of a predetermined number of video frames without synchronization confirmation by said second, timed detector means.

30. A combination as in claim 29, wherein said second, timed detector means further includes means for maintaining said synchronization lock signalling storage means in said first binary state said means for maintaining being responsive to detecting a predetermined subset of said synchronizing code word occurring in a time period alotted therefor.

* * * * *